United States Patent
Böhme et al.

(10) Patent No.: US 8,487,589 B2
(45) Date of Patent: Jul. 16, 2013

(54) METHOD AND DEVICE FOR DETERMINING THE START OF A CHARGING PROCESS FOR AN ENERGY STORAGE DEVICE IN AN ELECTRIC VEHICLE

(75) Inventors: Aiko Böhme, Ingelheim (DE); Heiko Bald, Modautal (DE)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 12/913,663

(22) Filed: Oct. 27, 2010

(65) Prior Publication Data

US 2011/0109276 A1  May 12, 2011

(30) Foreign Application Priority Data

Oct. 28, 2009  (DE) .......................... 10 2009 051 076

(51) Int. Cl.
*H02J 7/00* (2006.01)
*B60K 1/00* (2006.01)
*B60W 10/06* (2006.01)

(52) U.S. Cl.
USPC ........... 320/155; 320/156; 320/157; 320/158; 320/159; 320/160; 180/65.1; 180/65.21; 701/22

(58) Field of Classification Search
USPC ........................................................ 320/155
See application file for complete search history.

(56) References Cited

U.S. PATENT DOCUMENTS

| | | | | |
|---|---|---|---|---|
| 5,047,961 A | * | 9/1991 | Simonsen | 702/63 |
| 5,119,011 A | * | 6/1992 | Lambert | 320/136 |
| 5,396,163 A | * | 3/1995 | Nor et al. | 320/159 |
| 5,467,006 A | * | 11/1995 | Sims | 237/5 |
| 6,353,306 B1 | * | 3/2002 | Mixon | 320/160 |
| 6,879,889 B2 | * | 4/2005 | Ross | 701/22 |
| 7,313,469 B2 | * | 12/2007 | Wobben | 701/22 |
| 2003/0160594 A1 | * | 8/2003 | Trinh et al. | 320/156 |
| 2008/0243324 A1 | * | 10/2008 | Harris | 701/22 |

FOREIGN PATENT DOCUMENTS

| | | |
|---|---|---|
| DE | 2330255 A1 | 1/1975 |
| DE | 4337978 A1 | 6/1994 |
| DE | 29707965 U1 | 7/1997 |
| DE | 202009000259 U1 | 3/2009 |
| GB | 2273614 A | 6/1994 |
| WO | 03104018 A1 | 12/2003 |

OTHER PUBLICATIONS

German Patent Office, Search Report for German Application No. 102009051076.1, dated Sep. 7, 2010.

* cited by examiner

*Primary Examiner* — Yalkew Fantu
(74) *Attorney, Agent, or Firm* — Ingrassia Fisher & Lorenz, P.C.

(57) ABSTRACT

A method and a device are provided for determining the start of a charging process for an energy storage device in a vehicle, such as an electric vehicle. The method includes, but is not limited to determining at least one first parameter that indicates that a passenger is about to exit the electric vehicle. In addition, a first time $t_1$ at which the charging process concludes at the earliest is determined, and a second time $t_2$ at which the charging process is to have concluded at the latest is set, where $t_2 \geq t_1$. Further, a determination is made as to whether a third time $t_3$ at which a lowered second energy rate relative to the first energy rate is present before the second time $t_2$ has been reached, and the start of the charging process is set in such a way that the at least one third time $t_3$ lies within the charging process, and the charging process concludes by the second time $t_2$ at the latest.

15 Claims, 3 Drawing Sheets

US 8,487,589 B2

METHOD AND DEVICE FOR DETERMINING THE START OF A CHARGING PROCESS FOR AN ENERGY STORAGE DEVICE IN AN ELECTRIC VEHICLE

CROSS-REFERENCE TO RELATED APPLICATION

This application claims priority to German Patent Application No. 102009051076.1, filed Oct. 28, 2009, which is incorporated herein by reference in its entirety.

TECHNICAL FIELD

The technical field relates to a method and a device for determining the start of a charging process to achieve a predetermined charging state of an energy storage device in an electric vehicle.

BACKGROUND

Known from WO 03/104018 A1 is a method for enhancing and acquiring consumed energy in a vehicle, wherein the amount of energy removed from a first energy storage mechanism is replenished. A system is here provided that permits the provision and computation of electrical energy within a limited timeframe in electrically powered vehicles. In the method for enhancing and acquiring the consumed energy in the vehicle, which has an intake for the first energy storage mechanism, the first energy storage mechanism is removed from the vehicle, and a second energy storage mechanism with a settable fill level is incorporated into the vehicle. In addition, the difference in the amount of energy between the first and second storage mechanism is determined, and a value indicating the difference is transmitted to a data acquisition device. This method requires two energy storage mechanisms.

At least one object of the invention is to indicate a method and a device for determining the start of a charging process to achieve a predetermined charging state of an energy storage device in an electric vehicle, wherein only an energy storage device is required to this end, and the costs for the charging process are also minimized. In addition, other objects, desirable features and characteristics will become apparent from the subsequent summary and detailed description, and the appended claims, taken in conjunction with the accompanying drawings and this background.

SUMMARY

A method is provided for determining the start of a charging process to achieve a predetermined charging state of an energy storage device in an electric vehicle, which involves the following steps. At least one first parameter is determined, wherein the first parameter indicates that a passenger is about to exit the electric vehicle. In addition, a first time $t_1$ at which the charging process concludes at the earliest is determined, and a second time $t_2$ at which the charging process is to have concluded at the latest is set, wherein $t_2 \geq t_1$. Further, a determination is made as to whether a third time $t_3$ at which a lowered second energy rate relative to the first energy rate is present before the second time $t_2$ has been reached. Finally, the start of the charging process is set in such a way that the at least one third time $t_3$ lies within the charging process, and the charging process concludes by the second time $t_2$ at the latest.

The method makes it possible to charge the energy storage device of the electric vehicle without having to exchange the energy storage device for another energy storage device. As a result, the energy storage device can remain in the electric vehicle. In addition, because the method involves determining whether at least one third time $t_3$ at which a lowered second energy rate relative to the first energy rate is present before the second time $t_2$ has been reached, and the start of the charging process is set in such a way that the at least one third time $t_3$ lies within the charging process, it offers the advantage that the charging costs can be reduced, making the charging process as inexpensive as possible. It is here ensured that the charging process to have concluded at the latest by the second time $t_2$ has actually concluded.

In the absence of such a third time $t_3$ at which a lowered energy rate is present relative to the first energy rate before the second time $t_2$ has been reached, the start of the charging process is preferably set in such a way that the charging process takes place right after the passenger has exited the electric vehicle, meaning as soon as possible. This advantageously ensures that the charging process concludes at the earliest possible first time $t_1$.

In a preferred embodiment of the method according to the invention, when a majority of third times $t_3$ is determined, the start of the charging process is set in such a way that a maximum possible number of third times $t_3$ lies within the charging process. This advantageously further lowers the costs of the charging process by having the charging process take place to the greatest possible extent or even completely when the second, lowered energy rate is present. The first energy rate can be a day rate, and the second energy rate a night rate. The night rate is typically clearly diminished relative to the day rate.

In another preferred embodiment, the second time t2 is set by displaying the first time $t_1$ in a display device, and entering the second time $t_2$. The entry can here be made by the passenger. It is also possible for the entry to be made automatically, wherein $t_2 = t_1$. The latter option is especially advantageous for instances where the passenger makes no entry. The display device is preferably a component of an instrument panel in the electric vehicle, for example a dashboard.

The first parameter can involve turning off the ignition of the electric vehicle or removing an ignition key. In addition, the first parameter can entail unbuckling a seatbelt. The mentioned embodiments here make it possible to reliably note the fact that the passenger is about to exit the electric vehicle.

In another preferred embodiment of the method according to the invention, at least one second parameter is determined, wherein the second parameter indicates that the passenger has exited the electric vehicle, and wherein the display device is turned off after the second parameter has been determined. This advantageously reduces the energy consumption of the electric vehicle, since the display device is no longer activated after the electric vehicle has been exited.

The second parameter can involve a locking of the electric vehicle. In addition, the second parameter can here involve closing the vehicle doors, wherein the closure of the vehicle doors can be determined by means of a door contact switch. Further, the second parameter can be a predetermined time following the determination of the first parameter. The cited embodiments each enable a reliable detection that the passenger has completely exited the electric vehicle.

In another preferred embodiment of the method according to the invention, the times at which the first energy rate is present and/or the times at which the second energy rate is present are preset and stored in an onboard computer of the electric vehicle. The times at which the first energy rate is present and/or the times at which the second energy rate is present are here preferably preset by the passenger. This makes it possible to set the mentioned times based on the rate model selected by the passenger. In another embodiment, the times at which the first energy rate is present and/or the times at which the second energy rate is present are transmitted to the electric vehicle by means of a device arranged outside the electric vehicle, preferably a charging device for the energy storage device of the electric vehicle. As a result, the corresponding times need not be entered by the passenger.

In another preferred embodiment of the method according to the invention, the display device shows information about the times at which the first energy rate is present and the times at which the second energy rate is present. This informs the passenger about the corresponding energy rates in a simple manner, while advantageously making the corresponding times readily accessible for changes.

The first time $t_1$ can be determined by defining an actual duration of the charging process. This is advantageous for cases in which the energy storage device has a sensor that can determine the current charging state of the energy storage device. If a corresponding determination of charging process duration is not possible, the first time $t_1$ can be ascertained using a predetermined maximum duration of the charging process, for example the charging process duration for a case where the energy storage device is fully discharged.

The energy storage device preferably has at least one accumulator. The predetermined charging state is typically the maximum charging state of the energy storage device. It is also possible for the passenger to preselect the predetermined charging state. In particular, the predetermined charging state can here also be the maximum charging state of the energy storage device, or a half-completed charging state or charging state that allows a specific range of the electric vehicle, for example.

The passenger is typically a driver of the electric vehicle. The electric vehicle is preferably a motor vehicle, in particular a passenger car.

The embodiments of the invention further relate to a device for determining the start of a charging process to achieve a predetermined charging state of an energy storage device in an electric vehicle, wherein the device for implementing the method is designed according to one of the preceding embodiments.

Because it is designed for implementing one of the above methods according to the invention, the device according to the invention advantageously enables the lowest possible costs for the charging process, as has already been described above in conjunction with the method, and will not be additionally explained again here to avoid repetition.

A method according to an embodiment of the invention for charging an energy storage device of an electric vehicle involves the following steps. The start of a charging process to achieve a predetermined charging state of the energy storage device is ascertained by means of a method according to one of the preceding embodiments, and the charging process is initiated at the ascertained time.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
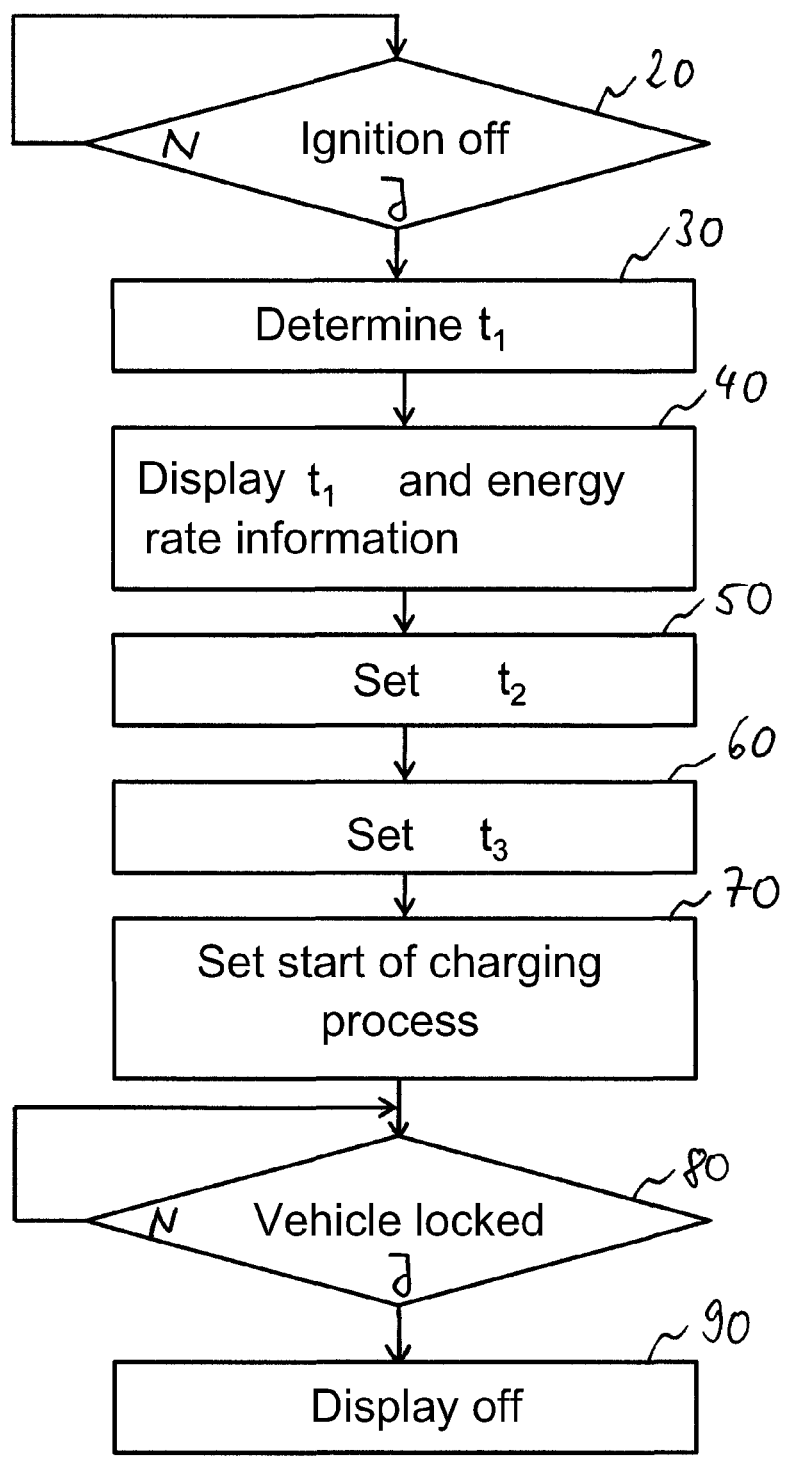
FIG. 1 shows a flowchart for a method to determine the start of a charging process to achieve a predetermined charging state of an energy storage device in an electric vehicle according to an embodiment of the invention.

FIG. 1 shows a flowchart for a method to determine the start of a charging process to achieve a predetermined charging state of an energy storage device of an electric vehicle according to an embodiment of the invention. A first step 20 here involves determining at least a first parameter, wherein the first parameter indicates that a passenger is about to exit the electric vehicle. In the embodiment shown, the first parameter here involves turning off the ignition of the electric vehicle, for example by removing an ignition key. If the ignition is not turned off, this step 20 is repeated. Once the ignition of the electric vehicle has been turned off, step 30 is performed to determine a first time t1 at which the charging process will have concluded at the earliest. For example, this can take place by determining an actual duration of the charging process or a predetermined maximum duration of the charging process.

Step 40 involves taking the determined first time $t_1$ and energy rate information encompassing the times at which a first energy rate is present, and times at which a second energy rate diminished by comparison to the first energy rate is present, as well as the corresponding energy rates and displaying them in a display device of the electric vehicle. Another step 50 involves setting a second time $t_2$ at which the charging process is to have concluded at the latest, Here, $t_2 \geq t_1$.

Step 60 involves determining whether a third time $t_3$ at which a lowered second energy rate relative to the first energy rate is present before the second time $t_2$ has been reached. Step 70 subsequently involves setting the start of the charging process in such a way that, if a third time $t_3$ was determined, it lies within the charging process, and the charging process concludes by the second time $t_2$ at the latest. In addition, step 80 involves determining at least one second parameter, wherein the second parameter indicates that the passenger has exited the electric vehicle. In the embodiment shown, the second parameter here involves a locking of the electric vehicle, for example by means of a central locking system. If the electric vehicle has not yet been locked, this step 80 is repeated. After the electric vehicle has been locked, the display device is turned off in step 90.

Figure 2:
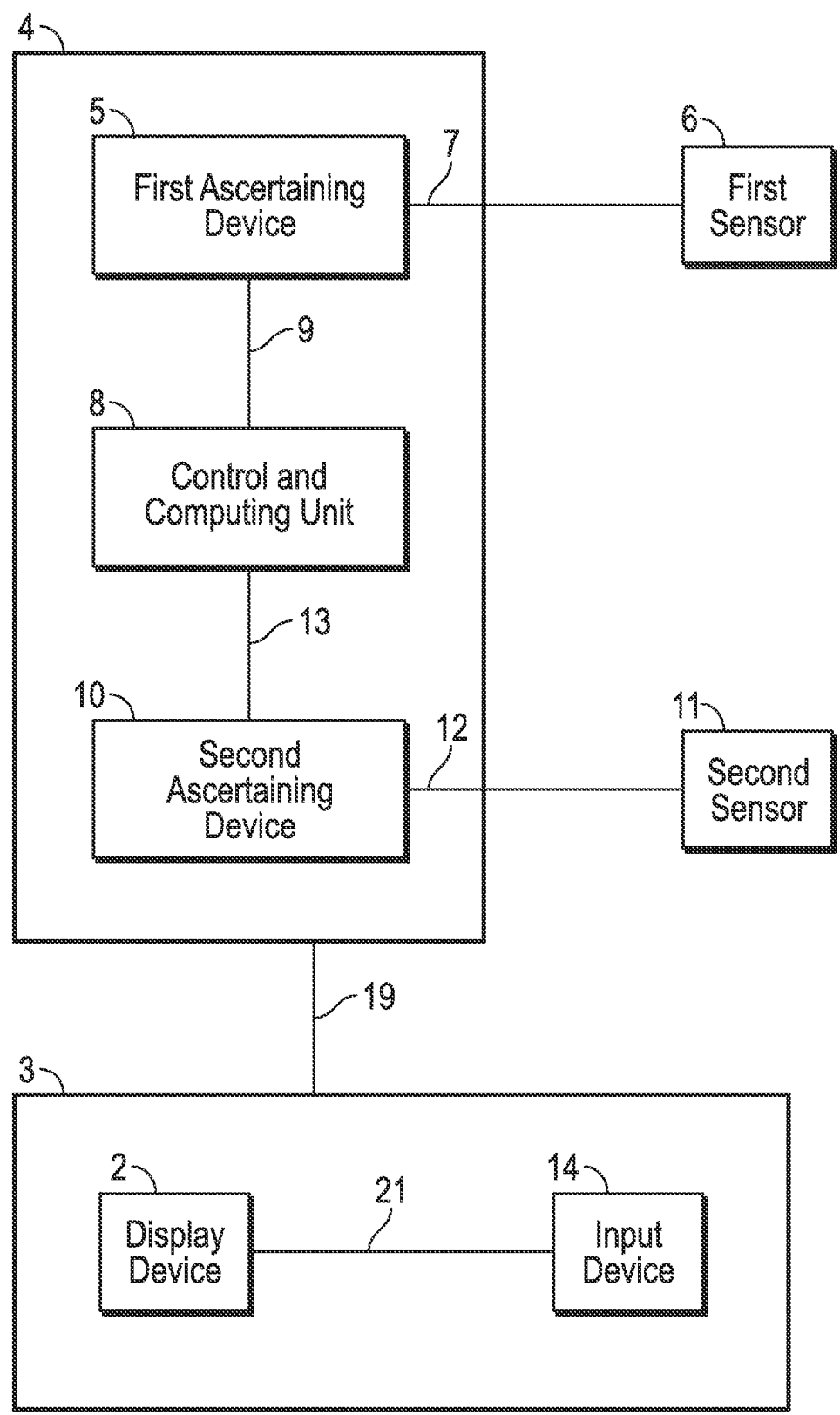
FIG. 2 shows a device for determining the start of a charging process to achieve a predetermined charging state of an energy storage device in an electric vehicle according to an embodiment of the invention.

FIG. 2 shows a device 4 for determining the start of a charging process to achieve a predetermined charging state for an energy storage device (not shown in any greater detail) in an electric vehicle (not shown in any greater detail) according to an embodiment of the invention. The device 4 has a first ascertaining device 5, wherein the first ascertaining device 5 is designed to ascertain at least one first parameter, which indicates that a passenger is about to exit the electric vehicle. To this end, the first ascertaining device 5 is connected with a first sensor 6 by means of a signal line 7. In the embodiment shown, the first parameter involves turning off the ignition of the electric vehicle, for example by removing an ignition key. In addition, the device 4 has a second ascertaining device 10, wherein the second ascertaining device 10 is designed to ascertain at least one second parameter indicating that the passenger has exited the electric vehicle. To this end, the second ascertaining device 10 is connected with a second sensor 11 by means of a signal line 12. In the embodiment shown, the second parameter involves a locking of the electric vehicle, for example by means of a central locking system. In addition, the device 4 has a control and computing unit 8, which is designed to determine the first time $t_1$ at which the charging process concludes at the earliest, and to determine whether at least one third time $t_3$ at which a lowered second energy rate relative to the first energy rate is present before the second time $t_2$ has been reached.

The device 4 is connected with an instrument panel 3 of the electric vehicle by means of a connecting line 19. The connecting line 19 can here at least partially be a component of a CAN bus of the electric vehicle. The instrument panel 3 has a display device 2 to display the first time $t_1$ and second time $t_2$, and an input device 14 for entering the second time $t_2$. The display device 2 and input device 14 are connected with each other by a connecting line 21. The device 4 enables the implementation of a method according to the invention for determining the start of a charging process to achieve a predetermined charging state of the energy storage device in the electric vehicle.

Figure 3:
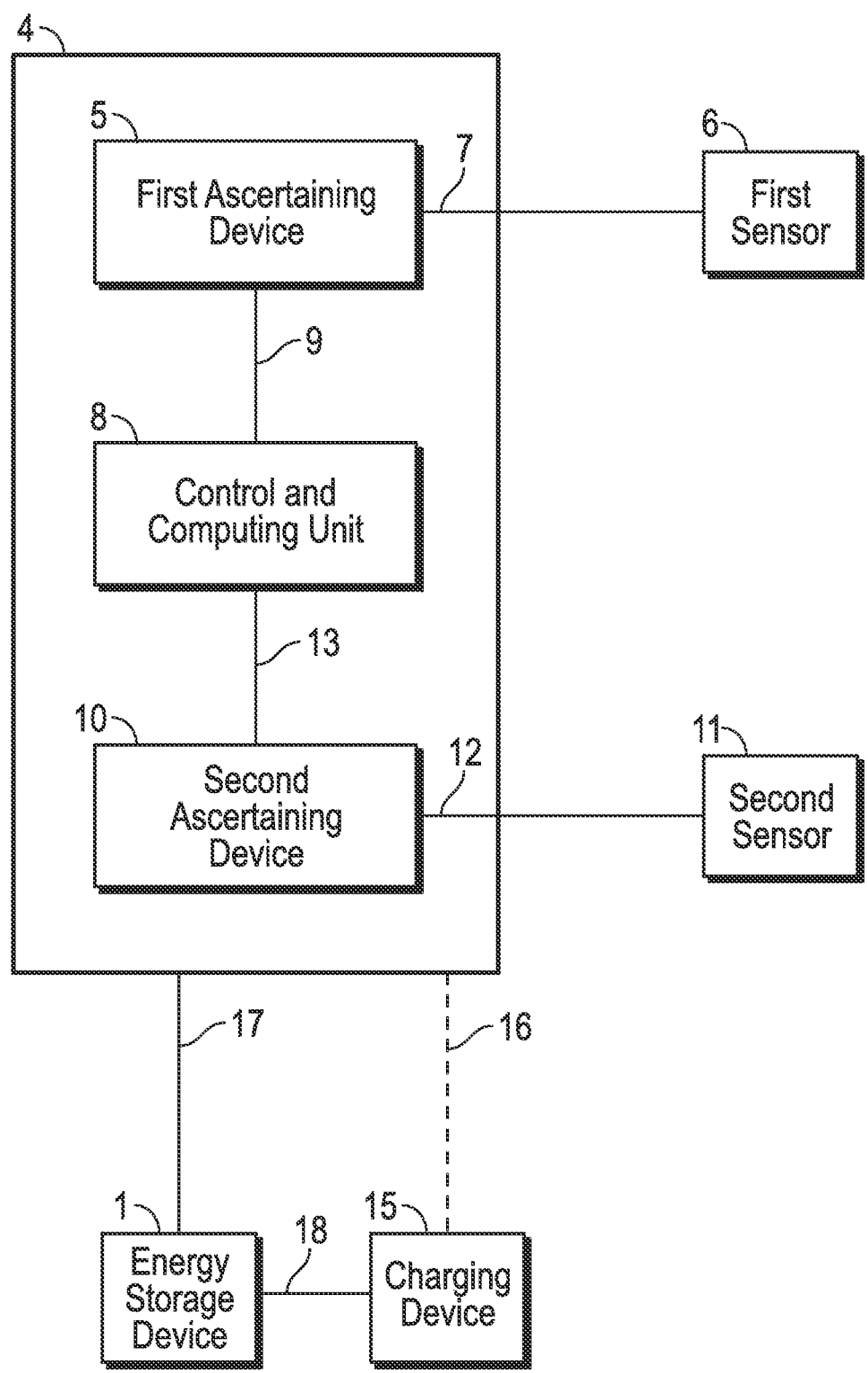
FIG. 3 shows the device for determining the start of the charging process of an energy storage device in the electric vehicle, and a charging device for charging the energy storage device according to an embodiment of the invention.

FIG. 3 shows the device 4 for determining the start of the charging process of an energy storage device 1 in the electric vehicle (not shown) as well as a charging device 15 for charging the energy storage device 1 according to an embodiment of the invention. Components with the same functions as in the preceding figures are labeled with the same reference numbers, and will not be described in any greater detail below. FIG. 3 does not show the instrument panel of the electric vehicle here. The device 4 is connected with the energy storage device 1, as diagrammatically shown by a continuous line 17. For example, this connection makes it possible to transmit the current charging state of the energy storage device 1 to the device 4. In addition, the device 4 is connected with the charging device 15, as diagrammatically shown by a dashed line 16. For example, the connection can here be established wirelessly. Information about the energy costs of the charging device 15 can be transmitted to the device 4 via this connection, for example. The energy storage device 1 is connected with the charging device 15 by means of a charging cable 18. In particular, the energy storage device 1 can encompass one or more accumulators. The charging device 15 is a recharging germinal, for example.

The embodiments of the invention proceed from the idea that electrical energy is less expensive during periods of reduced overall load, for example at night. Hooking up the electric vehicle to a charging device during a time when a night rate is in effect is very inconvenient, since it requires returning to the vehicle at a later point, and can also result forgetting to recharge.

The embodiments of invention offer the passenger, for example driver, an easy way to decide when to recharge his or her vehicle again. In one embodiment of the invention, this happens as described below. Just before the driver is ready to exit the vehicle, for example when the ignition key is removed and the driver is no longer buckled up, the vehicle information display automatically opens a special screen, the recharging screen. The recharging screen asks the driver to enter when he or she needs to have his or her vehicle recharged. For example, the driver arrives at 7 p.m. The initial setting for the time at which the vehicle will again be recharged, i.e., for the recharging time, is then the earliest possible time for a case where the recharging time measures 3 hours, or 10 p.m. The driver can change this time of day to another value, for example to 6 a.m. If the driver does nothing, the initial setting is used. The display is deactivated upon locking the vehicle at the latest.

The vehicle use the information about costs involved in recharging at different times. In one embodiment, the driver inputs the information about his or her energy rate one time. This information is stored, and used until such time as modified again. The correspondingly modified information is subsequently used. The information about this rate is displayed on the recharging screen, so as to make it easily accessible for changes. In another embodiment, the vehicle is provided with cost information relative to a recharging device, for example a recharging terminal, if the recharging device is capable of communicating with the vehicle. The vehicle can now determine whether the timeframe by which the vehicle must again be recharged makes it possible to take advantage of a favorable energy rate, and to recharge the energy storage device, for example the batteries, at a time reflecting optimal costs. The method according to the invention and device according to the invention are easy to implement, and permit lower costs.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for determining a start of a charging process to achieve a predetermined charging state of an energy storage device in a vehicle, the method comprising the steps of:
    ascertaining a first parameter that indicates whether a passenger is about to exit the vehicle;
    ascertaining a first time $t_1$ at which the charging process concludes at an earliest;
    displaying the first time $t_1$, a time a first energy rate is present and a time a second energy rate is present, the second energy rate lower than the first energy rate, on a display device of the vehicle;
    receiving a user input that sets a second time $t_2$ at which the charging process is to have concluded at the latest and the second time $t_2 \geq$ the first time $t_1$;
    ascertaining whether a third time $t_3$ at which the lowered second energy rate is present before the second time $t_2$ has been reached; and
    setting a start of the charging process in such a way that the third time $t_3$ lies within the charging process and the charging process concludes by the second time $t_2$ at the latest.

2. The method of claim 1, further comprising the step of determining a plurality of third times $t_3$, wherein the start of the charging process is set once a majority of the plurality of third times $t_3$ has been determined in such a way that a maximum possible number of the plurality of third times $t_3$ lies within the charging process.

3. The method of claim 1, wherein the first parameter is at least partially based upon turning off an ignition of the vehicle.

4. The method of claim 1, wherein the first parameter is at least partially based upon undoing a seatbelt.

5. The method of claim 1, wherein a second parameter is at least partially based upon the passenger exiting the vehicle, and further comprising the step of deactivating the display device after ascertaining the second parameter.

6. The method of claim 1, wherein a second parameter is at least partially based upon locking the vehicle.

7. The method of claim 1, further comprising the steps of presetting and storing the times at which a second energy rate is present in an onboard computer of the vehicle.

8. The method of claim 1, further comprising the steps of presetting and storing the times at which the first energy rate is present in an onboard computer of the vehicle.

9. The method of claim 1, further comprising the step of transmitting the times at which the first energy rate is present to the vehicle with a device located outside of the vehicle.

10. A device for determining a start of a charging process to achieve a predetermined charging state of an energy storage device in a vehicle, comprising:
   a first ascertaining device that ascertains a first parameter that indicates whether a passenger is about to exit the vehicle;
   a display device that displays a first time $t_1$;
   an input device that receives a user input of a second time $t_2$;
   a control and computing unit that:
      ascertains the first time $t_1$ at which the charging process concludes at an earliest; and
      ascertains whether a third time $t_3$ at which a lowered second energy rate relative to a first energy rate is present before the second time $t_2$, has been reached,
   wherein the second time $t_2$ is the time at which the charging process is to have concluded at the latest and the second time $t_2 \geq$ the first time $t_1$.

11. The device of claim 10, wherein the control and computing unit is further adapted to set the start of the charging process once a majority of a plurality of third times $t_3$ has been determined in such a way that a maximum possible number of the plurality of third times $t_3$ lies within the charging process.

12. The device of claim 10, wherein the first parameter is at least partially based upon turning off an ignition of the vehicle.

13. The device of claim 10, wherein the first parameter is at least partially based upon undoing a seatbelt.

14. The device of claim 10, wherein a second parameter is at least partially based upon the passenger exiting the vehicle, and the control and computing unit deactivates the display device after ascertaining the second parameter.

15. The device of claim 14, wherein the second parameter is at least partially based upon locking the vehicle.

* * * * *